United States Patent
Wong (10) Patent No.: US 10,282,710 B2
(45) Date of Patent: May 7, 2019

(54) SELECTIVE AUTHORIZATION METHOD AND SYSTEM

(75) Inventor: Erick Wong, Menlo Park, CA (US)

(73) Assignee: Visa International Service Association, San Francisco, CA (US)

( * ) Notice: Subject to any disclaimer, the term of this patent is extended or adjusted under 35 U.S.C. 154(b) by 461 days.

(21) Appl. No.: 13/517,512

(22) Filed: Jun. 13, 2012

(65) Prior Publication Data

US 2012/0317025 A1    Dec. 13, 2012

Related U.S. Application Data

(60) Provisional application No. 61/496,470, filed on Jun. 13, 2011.

(51) Int. Cl.
*G06Q 20/02* (2012.01)
*G06Q 20/32* (2012.01)
*G06Q 20/40* (2012.01)

(52) U.S. Cl.
CPC ....... *G06Q 20/027* (2013.01); *G06Q 20/3223* (2013.01); *G06Q 20/4012* (2013.01)

(58) Field of Classification Search
USPC .......................................................... 705/75
See application file for complete search history.

(56) References Cited

U.S. PATENT DOCUMENTS

| | | | |
|---|---|---|---|
| 5,715,314 A | 2/1998 | Payne et al. | |
| 7,107,242 B1* | 9/2006 | Vasil | G06Q 20/10 705/35 |
| 7,389,275 B2 | 6/2008 | Kemper | |
| 7,503,065 B1 | 3/2009 | Packingham et al. | |
| 7,720,850 B2 | 5/2010 | Lu et al. | |
| 2002/0143634 A1* | 10/2002 | Kumar et al. | 705/18 |
| 2002/0181710 A1* | 12/2002 | Adam et al. | 380/270 |
| 2004/0133480 A1 | 7/2004 | Domes | |
| 2007/0100773 A1* | 5/2007 | Wallach | G06Q 20/382 705/75 |
| 2008/0172317 A1 | 7/2008 | Deibert | |
| 2008/0179393 A1 | 7/2008 | Antoo | |
| 2008/0319869 A1 | 12/2008 | Carlson et al. | |
| 2009/0172402 A1 | 7/2009 | Tran | |
| 2009/0254479 A1 | 10/2009 | Pharris | |
| 2009/0298427 A1* | 12/2009 | Wilkinson et al. | 455/41.1 |
| 2010/0030644 A1 | 2/2010 | Dhamodharan | |

(Continued)

OTHER PUBLICATIONS

International Search Report in corresponding PCT/US2012/042266 application, 10 pgs.

(Continued)

*Primary Examiner* — Zeshan Qayyum
(74) *Attorney, Agent, or Firm* — Kilpatrick Townsend & Stock (57) ABSTRACT

Embodiments of the invention generally relate to mobile payments. For example, an application running on a phone can verify a passcode of a consumer. An indication of whether the passcode was verified and a time associated with when the passcode was verified is then sent to a mobile gateway. Later, when a user conducts one or more transactions, a payment processing network can use the indication sent to the mobile gateway to determine whether a the one or more transactions were conducted within a time window, which can be used to authorize the one or more transactions.

15 Claims, 6 Drawing Sheets

(56) References Cited

U.S. PATENT DOCUMENTS

| | | | |
|---|---|---|---|
| 2010/0100482 A1 | 4/2010 | Hardt | |
| 2010/0216425 A1 | 8/2010 | Smith | |
| 2010/0274688 A1* | 10/2010 | Hammad | G06Q 20/202 705/30 |
| 2010/0299267 A1 | 11/2010 | Faith et al. | |
| 2011/0022484 A1* | 1/2011 | Smith | G06Q 20/1085 705/17 |
| 2011/0078025 A1 | 3/2011 | Shrivastav | |
| 2011/0098023 A1 | 4/2011 | Hammad | |
| 2011/0213671 A1* | 9/2011 | Hirson et al. | 705/16 |
| 2012/0095852 A1* | 4/2012 | Bauer | G06Q 20/105 705/16 |

OTHER PUBLICATIONS

Chen, Lei-da, "A model of consumer acceptance of mobile payment," International Journal of Mobile Communications, 2008, vol. 6, No. 1, 2 pages. (abstract) Inderscience Publishers [online]. [Retrieved on Sep. 26, 2011]. <URL: www.inderscience.com>.

Choi, Young B., et al., "The state-of-the-art of mobile payment architecture and emerging issues," International Journal of Electronic Finance, 2006, vol. 1, No. 1, 2 pages. (abstract) Inderscience Publishers [online]. [Retrieved on Sep. 26, 2011]. <URL: www.inderscience.com>.

Chong, Soon-Keow, et al., "Feedback Credibility Issues in Trust Management Systems,"2007 International Conference on Multimedia and Ubiquitous Engineering. (MUE'07), Apr. 26-Apr. 28, 2007, Seoul, Korea, 2 pages. (abstract) IEEE Computer Society [online]. [Retrieved on Sep. 26, 2011]. <URL:http://doi.ieeecomputersociety.org/10.1109/MUE.2007.130>.

Horne, Bill, et al., "Dynamic Self-Checking Techniques for Improved Tamper Resistance," 2002, DRM 2001, LNCS 2320, pp. 141-159.

Pavlovic, Dusko, "Quantifying and Qualifying Trust: Spectral Decomposition of Trust Networks," 2011, FAST 2010, LNCS 6561, pp. 1-17.

Rankl, Wolfgang, et al., "Smart Card Handbook," 2 pages. (table of contents) Google Books [online]. [Retrieved on Sep. 26, 2011]. <URL: http://books.google.com>.

Sathiaseelan, J.G.R., et al., "MLSF: A Framework for Multi-Level Secure Composite Web Services," Advances in Information Sciences and Service Sciences, Dec. 2010, vol. 2, No. 4, pp. 71-78.

* cited by examiner

SELECTIVE AUTHORIZATION METHOD AND SYSTEM

CROSS-REFERENCES TO RELATED APPLICATIONS

This application is a non-provisional of and claims the benefit of the filing date of U.S. Provisional Patent Application No. 61/496,470, filed on Jun. 13, 2011, which is herein incorporated by reference in its entirety for all purposes.

BACKGROUND

Mobile phones are increasingly being used to conduct payment transactions. To enable a mobile phone to conduct payment transactions securely, a mobile application may be downloaded onto the phone, in which a legitimate consumer may provide personal information comprising login information to ensure security of the mobile application. A password may be required to launch the application so that transactions can be conducted.

Challenge questions can alternatively be sent to a user to verify a transaction to ensure that the person conducting the transaction is legitimate.

Embodiments of the invention address this and other problems, individually and collectively.

BRIEF SUMMARY

Embodiments of the present invention relate to conducting transactions with a portable device, such as a mobile phone.

Some embodiments of the invention are directed to a method comprising: receiving a validation message from a mobile communication device comprising a payment application, wherein the validation message includes an indication whether the payment application has verified a consumer's passcode; receiving an authorization request message from an access device, after the access device interacts with the mobile communication device during a transaction; and initiating authorization of the authorization request message after determining that the indication has been received.

Other embodiments of the invention relate to a server computer comprising a processor and a non-transitory computer readable medium, the non-transitory computer readable medium comprising code executable by the processor to implement the method.

Other embodiments of the invention relate to a method, performed by a mobile communication device comprising: receiving a passcode; determining that the passcode matches a previously stored passcode; and generating and transmitting a validation message comprising an indication of the passcode match to a server computer in a payment processing network.

Yet other embodiments of the invention relate to computer readable code which, when executed by at least one server computer, causes the at least one server computer to perform methods in accordance with embodiments of the invention.

These and other embodiments of the invention are described in further detail below.

DETAILED DESCRIPTION

Some embodiments of the invention are directed to a method including receiving, by a server computer in a payment processing network, a validation message from a mobile communication device comprising a payment application. The validation message includes an indication whether the payment application has verified a consumer's passcode, and may optionally include a time window in which subsequent transactions and be conducted. In such embodiments, challenge questions that are sent to a mobile phone to ensure that the person conducting the transaction is legitimate may not be required. These challenge questions require at least one message for every transaction and so require fairly significant computing resources. As such, embodiments of the invention may reduce the amount of computing resources that are required in order to carry out a transaction. In addition, embodiments that use a time window may remove the inconvenience of the user having to launch the payment application each time a transaction is conducted. As such, embodiments of the invention may reduce the amount of interaction between the user and their device that is required to conduct a transaction. This may be of particular benefit if the user wants to conduct many transactions within a short period of time.

The server computer then receives an authorization request message from an access device, after the access device interacts with the mobile communication device during a transaction. The server computer can then initiate authorization of the authorization request message after determining that the indication has been received.

In embodiments of the invention, initiating authorization of an authorization request message may include authorizing the authorization request message, or forwarding the authorization request message to another entity (e.g., an issuer) that will authorize or not authorize the authorization request message. For example, in some cases, after receiving the indication that the user of the mobile communication device has entered the correct passcode into the mobile communication device, and determining that the transaction is in condition for authorization (e.g., the transaction amount is within the user's credit limit and/or there is no indication of fraud), the server computer can simply authorize the transaction by replying with an authorization response message indicating approval of the transaction. In another example, after receiving the indication that the user of the mobile communication device has entered the correct passcode into the mobile communication device, and determining that the transaction is in condition for authorization, the server computer can modify the authorization request message to include an indicator (e.g., the value "1") that indicates that the passcode has been correctly entered. This modified authorization request message can then be forwarded to the issuer for approval.

In some embodiments, a time window may be provided for transactions that can be authorized (e.g., by the payment processing network or issuer). This time window may be entered by the user into the mobile communication device, and it may be transmitted to a mobile gateway server computer in communication with the payment processing network or to the payment processing network (or server computer therein). This time window information may be transmitted to the server computer in the validation message or in a separate message.

In some embodiments, after the user conducts a transaction at a first access device at a first merchant, the user may conduct a second transaction at a second access device at a second merchant. An authorization request message for the second transaction may be received from the second access device, after the second access device interacts with the mobile communication device during a second transaction. The server computer determines that the second transaction occurs within the time window, and the authorization of the second authorization request message is initiated. If the second transaction did not occur within the time window, authorization would not be initiated.

As an illustration, a user may conduct a first transaction at a first merchant by launching a payment application on a mobile phone. The user may enter a password (e.g. "CAT") into the mobile phone and may also enter a time window in which subsequent transactions can be conducted using the previously entered password as an authentication token. The time window entered may be, for example, 1 hour. This time window may be sent to a central server computer and stored there. During the next hour, any authorization request messages associated with the mobile device (or payment account associated with the mobile device) may be authorized by the server computer (or forwarded to another entity with an indication that the correct password was entered by the user). If a transaction occurs outside of the window, then the consumer would need to re-enter the password into the mobile phone to conduct transactions.

Embodiments of the present invention provide for a number of technical advantages. In embodiments of the invention, a user can enter a verification token into a mobile communication device one time, and this information can be used to authenticate the user in payment transactions before they are conducted. This provides for improved processing efficiency over conventional systems, which may require authentication of a user after each and every transaction. Consequently, embodiments of the invention are more convenient for a user to conduct transactions, and require fewer computing resources. Further, embodiments of the invention provide greater security, as transaction security can be controlled by the user. Unauthorized individuals who seek to use the user's payment account would need to have the user's mobile communication device, as well as the user's password, therefore making it very difficult for those individuals to conduct fraudulent transactions.

Prior to discussing the specific embodiments of the invention, a further description of some terms can be provided for a better understanding of embodiments of the invention.

A "passcode," as used herein, can refer to a secret word or string of characters that is used for authenticating a consumer. In some embodiments, a passcode can be purely numeric, such as the personal identification number (PIN) commonly used for ATM access. In yet other embodiments, a passcode can be formed by biometric information or any other suitable signal, such as a movement or gesture performed by a consumer. In other embodiment, it can be a string of letters (e.g., forming a word).

A "time window" can refer to a set or variable time period which is measured by a start time point and an end time point. In some embodiments, a time window can be used to limit the transactions that may authorized according to one set of conditions if the transaction is conducted within the time window. Exemplary time windows may be, for example, 1 hour, 1 day, 1 week, etc. Other time windows may specify start and end times (e.g., from 9 am on Sunday to 12 pm on Sunday).

A "validation message," can include a message containing information pertaining to the passcode, including an indication whether the passcode has been verified, the passcode itself, a time when the passcode was entered, and/or an associated time window. It can be in any suitable data format.

An "indication," as used herein, can refer to any suitable information that indicates whether a consumer's passcode has been verified or not. An example of an indication may simply be the value "1" which may indicate that the passcode has been verified, while the value "0" may indicate that the passcode has not been verified.

An "authorization request message" can refer to a message that requests that an issuer of the payment card authorize a transaction. An authorization request message according to an embodiment of the invention may comply with ISO (International Organization for Standardization) 8583, which is a standard for systems that exchange electronic transactions made by cardholders using payment cards. An authorization request message according to other embodiments may comply with other suitable standards. In some embodiments, the authorization request message may comprise information relating to the passcode, for example, the indication of whether the passcode has been verified.

An "authorization response message" can refer to a message that is in response to an authorization request message. The authorization response message may indicate whether the issuer of the payment card has approved or denied authorization of a transaction. An authorization response message according to an embodiment of the invention may comply with ISO (International Organization for Standardization) 8583, which is a standard for systems that exchange electronic transactions made by cardholders using payment cards. An authorization response message according to other embodiments may comply with other suitable standards.

I. Exemplary Systems

Figure 1:
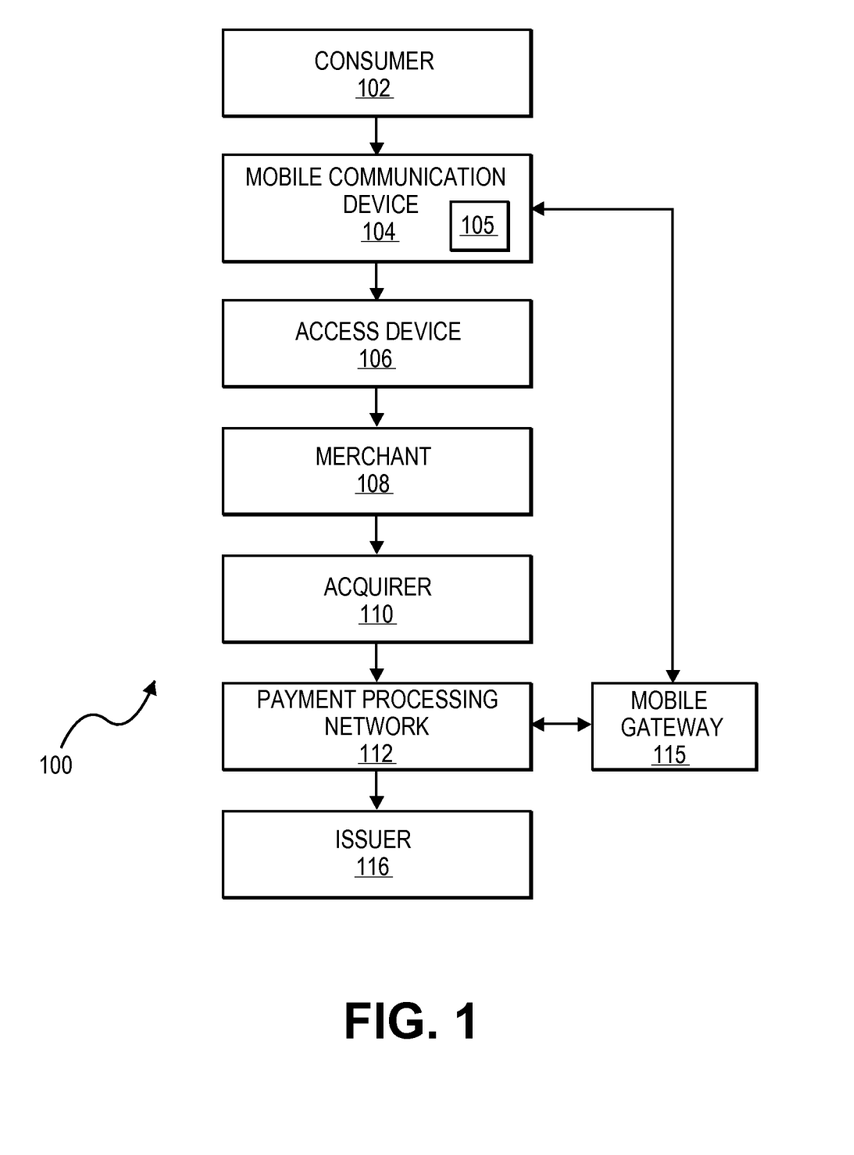
FIG. 1 shows a block diagram of a system according to an embodiment of the invention.

An exemplary system 100 for embodiments of the invention can be seen in FIG. 1. For simplicity of discussion, only one of each component is shown. It is understood, however, that embodiments of the invention may include more than one of each component. In addition, some embodiments of the invention may include fewer than all of the components shown in FIG. 1. Also, the components in FIG. 1 may communicate via any suitable communication medium (including the Internet or private networks, wireless networks, cell phone networks, telephone networks, any other suitable networks, or combinations thereof), using any suitable communication protocol.

FIG. 1 shows a system 100 that can be used in an embodiment of the invention. The system 100 includes a merchant 108 and an acquirer 110 associated with the merchant 108. In one typical transaction, a consumer 102 may purchase goods or services at the merchant 108 using a mobile communication device 104. The acquirer 110 is typically an acquiring bank that is associated with the merchant 108 and processes all merchant transactions associated with the merchant access device 106.

The consumer 102 (or user) may be an individual, or an organization such as a business that is capable of purchasing goods or services.

The mobile communication device 104 may be in any suitable form. For example, suitable mobile communication devices can be hand-held and compact so that they can fit into a consumer's wallet and/or pocket (e.g., pocket-sized). The mobile communication device 104 typically comprises a processor, and a memory, input devices, and output devices, operatively coupled to the processor. Specific examples of mobile communication devices can include forms of portable communication devices, such as cellular or wireless phones, tablets, smartphones, personal digital assistants (PDAs), pagers, portable computers, and the like.

The mobile communication device 104 may include a payment application 105 stored in its computer readable medium. When executed by a processor equipped in the mobile communication device 104, the payment application communicates payment information to an access device.

Figure 3:
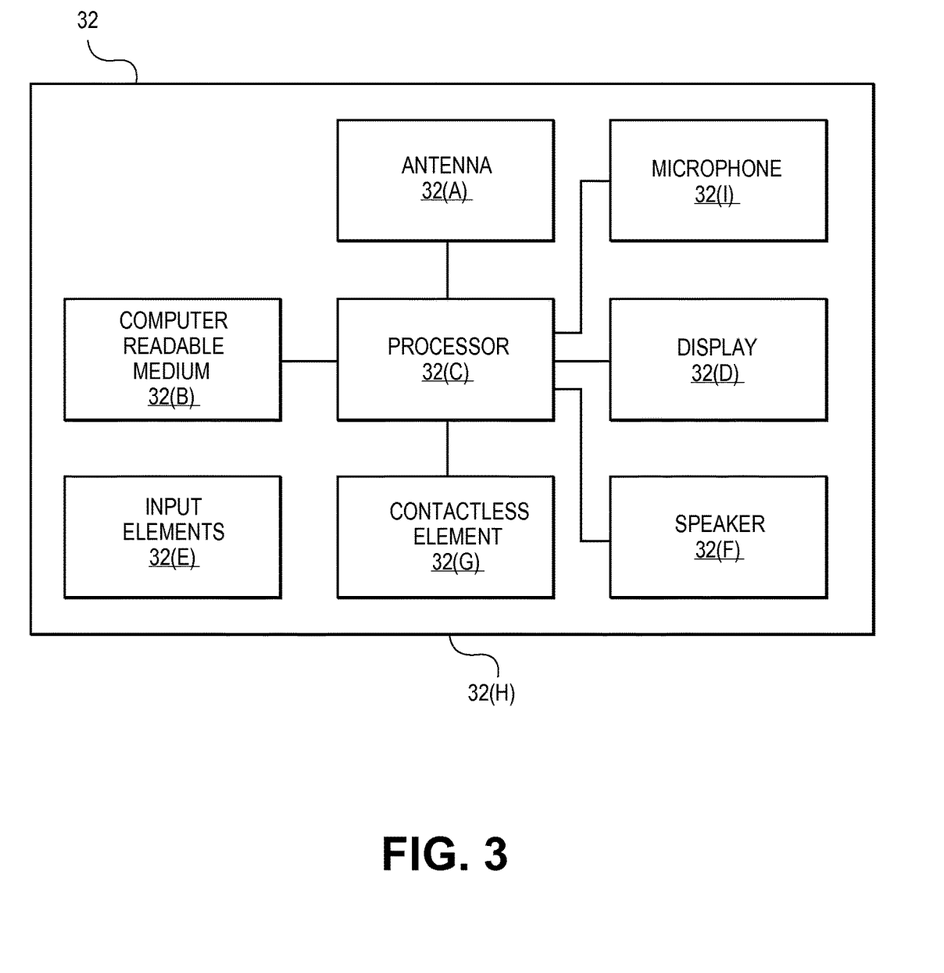
FIG. 3 is a block diagram of a mobile communication device.
Figure 5:
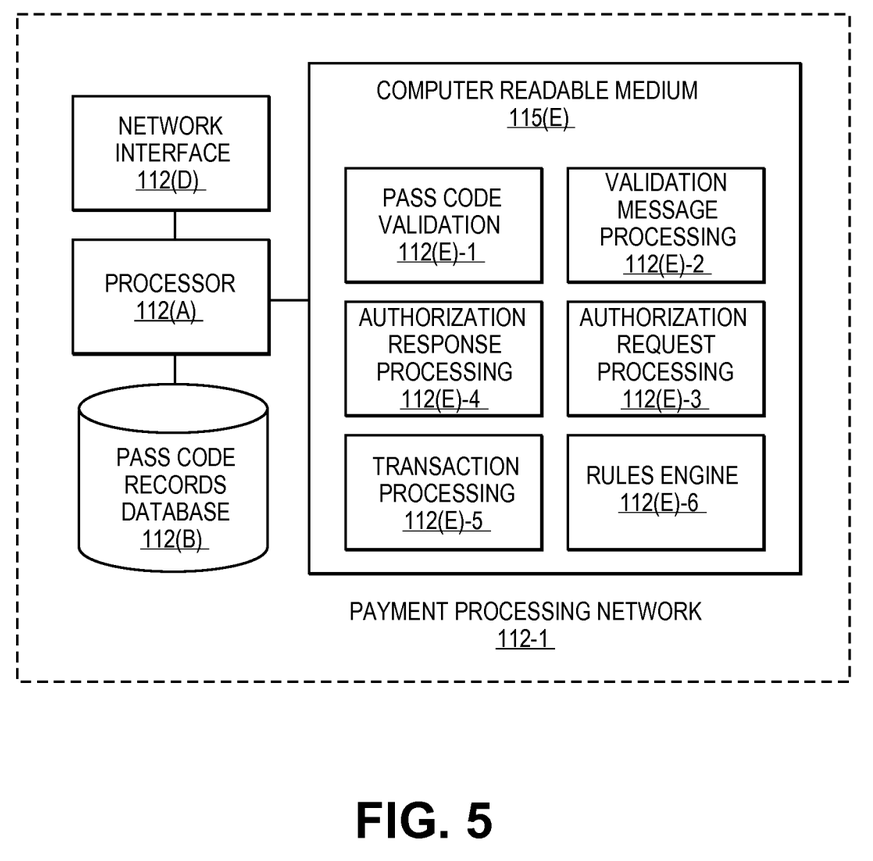
FIG. 5 is a block diagram of an exemplary payment processing network server computer.

FIG. 3 shows a block diagram of a mobile communication device 32 that can be used in embodiments of the invention. The mobile communication device 32 can be both a notification device that can receive alert messages, as well as a portable device that can be used to make payments. The exemplary mobile communication device 32 may comprise a computer readable medium and a body as shown in FIG. 5(*a*). The computer readable medium 32(*b*) may be present within the body 32(*h*), or may be detachable from it. The body 32(*h*) may be in the form a plastic substrate, housing, or other structure. The computer readable medium 32(*b*) may be in the form of (or may be included in) a memory that stores data (e.g., issuer account numbers, loyalty provider account numbers, etc.) and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, loyalty account information (e.g., a loyalty account number), a bank identification number (BIN), credit or debit card number information, account balance information, expiration date, consumer information such as name, date of birth, etc. Any of this information may be transmitted by the mobile communication device 32. The computer readable medium 32(*b*) may also comprise code for implementing a method comprising receiving a passcode, determining that the passcode matches a previously stored passcode, and generating and transmitting a validation message comprising an indication of the passcode match to a server computer in a payment processing network In some embodiments, information in the memory may also be in the form of data tracks that are traditionally associated with credit cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks abide by it. It contains the cardholder's account, encrypted PIN, plus other discretionary data.

The mobile communication device 32 may further include a contactless element 32(*g*), which is typically implemented in the form of a semiconductor chip (or other data storage element) with an associated wireless transfer (e.g., data transmission) element, such as an antenna. Contactless element 32(*g*) is associated with (e.g., embedded within) mobile communication device 32 and data or control instructions transmitted via a cellular network may be applied to contactless element 32(*g*) by means of a contactless element interface (not shown). The contactless element interface functions to permit the exchange of data and/or control instructions between the mobile device circuitry (and hence the cellular network) and an optional contactless element 32(*g*).

Contactless element 32(*g*) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the mobile communication device 32 and an interrogation device. Thus, the mobile communication device 32 is capable of communicating and transferring data and/or control instructions via both cellular network and near field communications capability.

The mobile communication device 32 may also include a processor 32(*c*) (e.g., a microprocessor) for processing the functions of the mobile communication device 32 and a display 32(*d*) to allow a consumer to see phone numbers and other information and messages. The mobile communication device 32 may further include input elements 32(*e*) to allow a user to input information into the device, a speaker 32(*f*) to allow the user to hear voice communication, music, etc., and a microphone 32(*i*) to allow the user to transmit her voice through the mobile communication device 32. The mobile communication device 32 may also include an antenna 32(*a*) for wireless data transfer (e.g., data transmission).

System 100 may also include an issuer 116 and a payment processing network 112. The issuer 108 is typically a bank that issues a payment from accounts associated with the mobile communication devices of the consumer.

The payment processing network 112 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 112 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 112 may use any suitable wired or wireless network, including the Internet.

The payment processing network 112 may be in communication with the mobile gateway 115, which provides an interface between the mobile communication device 104 and the payment processing network 112.

Figure 4:
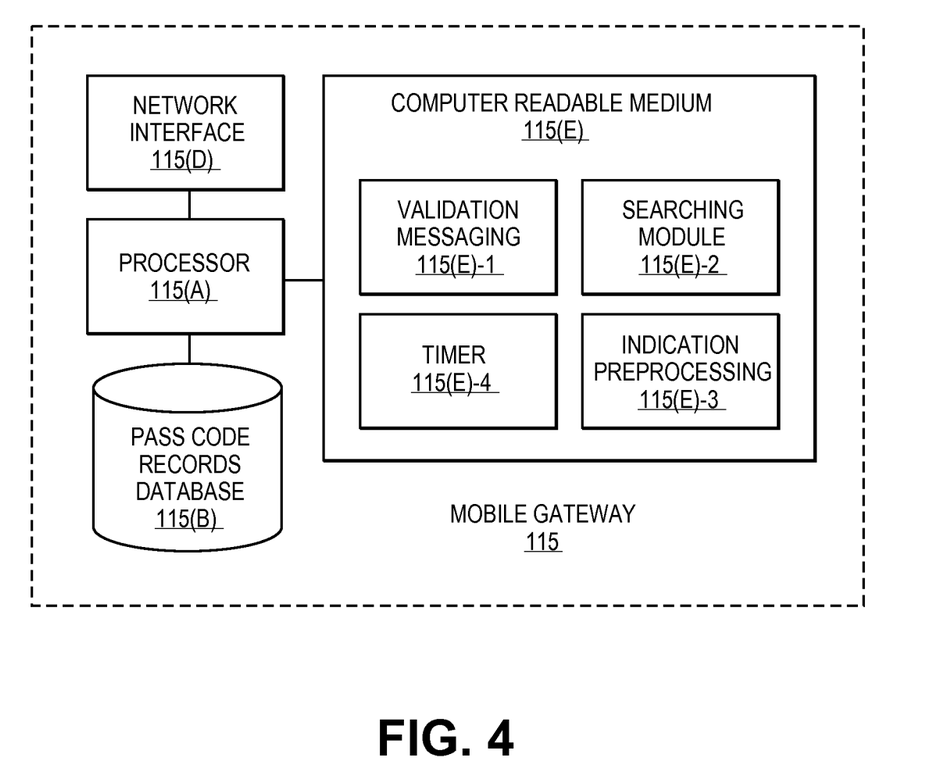
FIG. 4 is a block diagram of a mobile gateway server computer.

FIG. 4 shows a block diagram of an exemplary mobile gateway 115. The mobile gateway 114 may be a server computer comprising a processor 115(*a*), coupled to a non-transitory computer readable medium 115(*e*), network interface 115(*d*), and a passcode records database 115(*b*). The network interface 115(d) may enable the mobile gateway 115 to communicate with communication and telecommunication networks, or other suitable networks. The processor 115(a) processes communications transmitted and received via the network interface 115(d). The non-transitory computer readable medium 115(e) may comprise software modules, such as a validation message module 115(e)-1, searching module 115(e)-2, timer module 115(e)-4, and indication processing module 115(e)-3. The validation messaging module 115(e)-1, may process data from a validation message received from a mobile communication device 104.

FIG. 5 shows an exemplary payment processing network server computer 112-1. The server computer may comprise a processor 112(a), coupled to a non-transitory computer readable medium 112(e), network interface 112(d), and an account database 112(b). The network interface 112(d) may enable the payment processing network 112 to communicate via communication and telecommunication networks, or other suitable networks to other entities, such as an issuer 116, acquirer 110, mobile gateway 115, or other suitable entities. The processor 112(a) processes communications transmitted and received via the network interface 112(d). The processor 112(a) may be enabled to execute code comprised in the non-transitory computer readable medium 112(e) to perform functions. The non-transitory computer readable medium 115(e) may comprise software modules, such as a passcode validation module 112(e)-1, a validation message processing module 112(e)-2, an authorization request processing module 112(e)-3, an authorization response processing module 112(e)-4, a transaction processing module 112(e)-5, and a rules engine 112(e)-6.

In some embodiments of the invention, the rules engine 112(e)-6 may comprise a set of rules to be satisfied. If the rules are not satisfied, then the consumer is prompted for resubmission of the passcode, as an added security measure. For example, the consumer may set a rule that no transactions over $200 can be automatically authorized, so when the payment processing network 112 receives an authorization request message for a transaction for $300, the rules engine 112(e)-6 checks the rule, and the consumer is prompted to re-enter the passcode for verification to confirm the $300 transaction. The set of rules may include various rules, determined by the consumer, payment processing network, and/or issuer. Examples include thresholds, such as a dollar limit for a transaction (e.g., no transactions over $200), and a velocity limit (e.g., up to 10 transactions in 1 day). Other examples of rules may be related to a geographic location. For example, if the consumer is going on vacation to Brazil, the rule may be set to only authorize transactions in Brazil. Other transactions conducted in New York or Los Angeles will require resubmission of a passcode to be verified, so that the transaction in a non-approved geographic location may be confirmed as legitimate and not fraudulent. The set of rules may also include rules related to the merchant, such as a merchant category (e.g., transactions at clothing retailers will require resubmission of a passcode), or a specific merchant (e.g., transactions at Tiffany's will require resubmission of a passcode).

The authorization request processing module 112(e)-3 may initiate authorization of the transaction, and form a modified authorization request message to be transmitted to an issuer 116. The modified authorization request message to the issuer 116 may include additional information not typical of authorization request messages to issuer 116, such as the time when the passcode was entered, the associated time window, the indication of whether the passcode was verified, etc. The indication whether the passcode was verified, the time when the passcode was entered, and the time window may be used by the issuer 116 to authorize the transaction.

The authorization response processing module 112(e)-4 may process the authorization response message received from the issuer 116. If the authorization response message indicates that the transaction is authorized, then a transaction processing module 112(e)-5 may begin processing the transaction with an acquirer 110. The authorization response message may be forwarded, by the authorization response processing module 112(e)-4, to the merchant 108 access device 106 to indicate to the merchant 108 and the consumer 102 that the transaction is complete.

The payment processing network 112 may also comprise an accounts database 112(b) comprising stored data of transaction history for accounts associated with consumers. The account database 112(b) may also by searched by the rules engine 112(e)-6 and passcode verification module 112(e)-1, or other modules to determine specific data relating to specific accounts. For example, particular rules may apply to a particular account, and if the payment processing network 112 performs passcode verification, then the account database 112(b) may store specific passcodes associated with a consumer's account for verification with an entered passcode.

The merchant 108 may also have, or may receive communications from, an access device 106 that can interact with the mobile communication device 104. The access device 106, according to embodiments of the invention, can be in any suitable form. Examples of access devices include point of sale (POS) devices, cellular phones, PDAs, personal computers (PCs), tablet PCs, handheld specialized readers, set-top boxes, electronic cash registers, automated teller machines (ATMs), virtual cash registers, kiosks, security systems, access systems, and the like.

If the access device 106 is a point of sale terminal, any suitable point of sale terminal may be used including card or phone readers. The card or phone readers may include any suitable contact or contactless mode of operation. For example, exemplary readers can include RF (radio frequency) antennas, magnetic stripe readers, etc. to interact with the mobile communication devices 104.

The various participants and elements described herein with reference to FIG. 1 may operate one or more computer apparatuses to facilitate the functions described herein. Any of the elements in FIG. 1, including any servers or databases, may use any suitable number of subsystems to facilitate the functions described herein.

Figure 6:
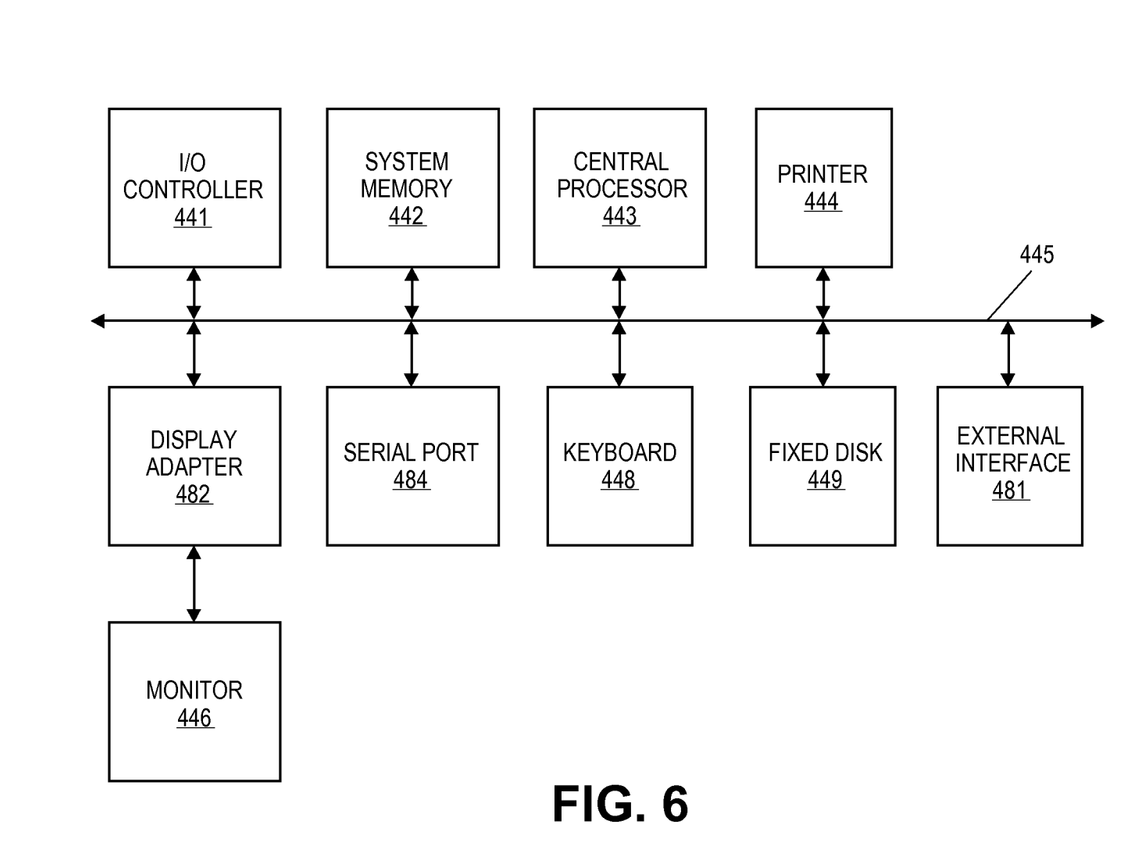
FIG. 6 is a block diagram of an exemplary computer apparatus.

Examples of such subsystems or components are shown in FIG. 6. The subsystems shown in FIG. 6 are interconnected via a system bus 445. Additional subsystems such as a printer 444, keyboard 448, fixed disk 449 (or other memory comprising computer readable media), monitor 446, which is coupled to display adapter 482, and others are shown. Peripherals and input/output (I/O) devices, which couple to I/O controller 441 (which can be a processor or other suitable controller), can be connected to the computer system by any number of means known in the art, such as serial port 484. For example, serial port 484 or external interface 481 can be used to connect the computer apparatus to a wide area network such as the Internet, a mouse input device, or a scanner. The interconnection via system bus allows the central processor 443 to communicate with each subsystem and to control the execution of instructions from system memory 442 or the fixed disk 449, as well as the exchange of information between subsystems. The system memory 442 and/or the fixed disk 449 may embody a computer readable medium.

II. Exemplary Methods

Figure 2:
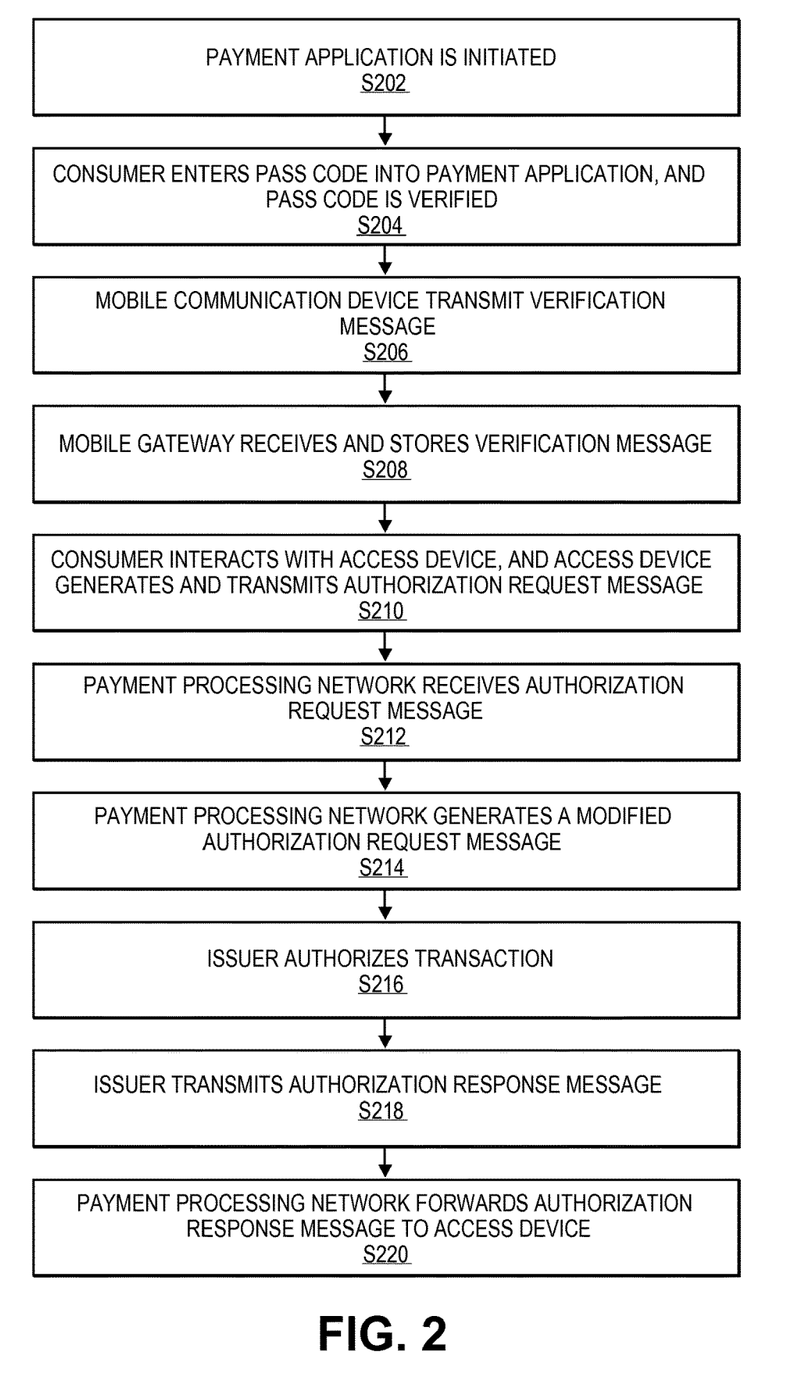
FIG. 2 is a flowchart illustrating an embodiment of the invention.

Methods according to embodiments of the invention can be described with respect to FIGS. 1 and 2. FIG. 2 shows a flowchart illustrating a method according to an embodiment of the invention.

A consumer 102 may first initiate a payment application 105 on a mobile communication device 104 (step S202). The consumer 102 then enters a passcode into the payment application 105 and the passcode is then verified by the payment application 105 (step S204).

As an illustration, a consumer may launch the payment application 105 stored on the mobile communication device 104. After the payment application 105 is running, the payment application 105 can request that the consumer 102 enter a passcode. When the consumer 102 enters the passcode, the payment application 105 receives the passcode and then verifies whether the passcode is valid. The passcode (in the clear or encrypted) may be previously stored in the payment application 105 or elsewhere on the mobile communication device 104, and the stored passcode can be compared to the entered passcode to determine if the consumer 102 has entered the correct passcode. If the correct passcode has not been entered, the payment application 105 may request that the consumer 102 re-enter the passcode.

A validation message comprising indication that the passcode was verified, and optionally the time at which the passcode was entered into the mobile communication device 104 and a time window, is then sent to the mobile gateway 115 by the mobile communication device 104 (step 206). In some embodiments, the validation message may also include other information such as account information, such as an account identifier, a verification value, phone number (or other device ID), alias, cryptogram, etc. In other embodiments, the time window may be provided to the mobile gateway 115 prior to the transmission of the validation message. For example, prior to conducting a transaction, the consumer 102 may use a computer terminal to access a Web site associated with the payment processing network 112 or the mobile gateway 115, and may provide a time period in which passcode entered into a mobile communication device 104 will only be required once. For instance, the time period provided by a computer operated by a user may be from 9 am to 12 pm on Sunday. The user may conduct a transaction on Sunday at 10 am by entering a passcode into the user's mobile phone, and this one passcode may be a sufficient authentication token that will allow the user to conduct transactions until 12 pm on Sunday.

As noted above, the validation message may optionally include a timestamp. The timestamp can include an absolute time or a relative time (e.g., the passcode validation message may signal the relative start time). In some embodiments, the timestamp is in the validation message, while in other embodiments the timestamp is stored in the header of the validation message, while in yet other embodiments, the timestamp is inferred from the point in time the validation message is received or transmitted.

The mobile gateway 115 then receives the verification message and stores the verification message and its contents. The contents may be associated with an identifier such as an account identifier (or device ID) associated with the mobile communication device 104. The mobile gateway 115 may optionally forward all or parts of the verification message and its contents to the payment processing network 112 (step S208).

Next, the consumer 102 conducts a transaction using the mobile communication device 104. The consumer 102 can initiate the interaction between the mobile communication device 104 and the access device 106. The access device 106 then generates and transmits an authorization request message to the issuer 116 via the acquirer 110 and the payment processing network 112 (step S210). In some embodiments, the mobile communication device 104 has a first contactless element that interacts with a second contactless element in the access device 106.

Once the payment processing network 112 receives the authorization request message, the payment processing network 112 can query the mobile gateway 115 to determine whether a passcode has been validated for the mobile communication device 104 (step S212). It may optionally check to see if the authorization request message is received within the predetermined time window. For example, if the time window is one hour, and the current transaction is conducted 30 minutes after the passcode was entered into the mobile communication device 104, the mobile gateway 115 can determine that the transaction is being conducted within the predetermined time window.

In some embodiments, the mobile gateway 115 can use the account identifier transmitted in the authorization request message to search the passcode database for an indication of whether the consumer 102 entered the correct password into the mobile communication device 104 within the correct time window.

Although the functions of the mobile gateway 115 are described in detail, other embodiments do not require a mobile gateway 115. For instance, the functions of the mobile gateway 115 can be present in the payment processing network 112 (or server computer therein) in other embodiments of the invention.

The payment processing network 112, after receiving the indication that the correct passcode was entered into the mobile communication device 104, may initiate authorization of the transaction. In some embodiments, the payment processing network 112 may modify the authorization request message (step S214). The modified authorization request message may be modified with the indication that the passcode was verified, optionally or alternatively an associated time window and a timestamp (e.g., time when passcode was entered). The payment processing network 112 may then electronically transmit the modified authorization request message to an issuer 112 for authorization.

In some embodiments, if the indication is not present, then the payment processing network 112 may send an authorization response message back to the access device 106 indicating that the transaction is denied. Alternatively, the payment processing network 112 may send a modified authorization request message to the issuer 112 indicating that the passcode was not verified. The issuer 112 could then use this information to determine whether or not to authorize the transaction.

If the payment processing network 112 does not make the authorization decision, the indication that the passcode was verified, the time entered, and the associated time window can then be used by the issuer 116 to authorize the transaction (step S216).

After the issuer 116 approves or disapproves (e.g., declines) of the transaction conducted with the mobile communication device 104, an authorization response message is transmitted by the issuer 116 to the payment processing network 112 indicating whether the transaction is authorized (step S218).

The authorization response message may then be forwarded by the payment processing network 112 to merchant 108 via the acquirer 110. The access device 106 may receive the authorization response message (step S220). A normal clearing and settlement process may occur at the end of the day.

As noted above, in some embodiments, after the user conducts a transaction at a first access device at a first merchant, the user may conduct a second transaction at a second access device at a second merchant (not shown in FIG. 1). In such other embodiments, the second merchant may be associated with a second acquirer and may be connected to the payment processing network 112. An authorization request message for the second transaction may be received from the second access device, after the second access device interacts with the mobile communication device during a second transaction. The server computer in the payment processing network 112 or in the mobile gateway 115 determines that the second transaction occurs within the time window, and the authorization of the second authorization request message is initiated (as described above). If the second transaction did not occur within the time window, authorization would not be initiated (as described above).

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a mobile gateway from a mobile communication device, a time window specified by a consumer during which the consumer does not have to re-enter a passcode for each transaction after a payment application in the mobile communication device has verified the consumer's passcode, the time window including a start time point and an end time point;

receiving, by the mobile gateway from the mobile communication device comprising the payment application over a first network, a validation message that includes an indication that the payment application has verified the consumer's passcode, an account identifier, and a timestamp when the passcode was entered into the mobile communication device;

storing, by the mobile gateway in a database, the validation message including the indication that the payment application has verified the consumer's passcode, the account identifier, and the timestamp when the passcode was entered into the mobile communication device;

receiving, by a payment processing network, a first authorization request message comprising the account identifier from a first access device over a second network, after the first access device interacts with the mobile communication device during a first transaction;

querying, the mobile gateway by the payment processing network, to determine if the consumer's passcode has been validated;

searching, by the mobile gateway, the database using the account identifier received in the first authorization request message from the first access device;

determining, as a result of searching the database by the mobile gateway, that the validation message associated with the mobile communication device has been received indicating that the payment application has verified the consumer's passcode;

determining, by the mobile gateway, that the first transaction is occurring within the time window after the timestamp;

receiving, by the payment processing network from the mobile gateway, the indication that the payment application has verified the consumer's passcode has been received, and a determination that the validation message with the indication that the payment application has verified the consumer's passcode has been received and that the first transaction is occurring during the time window;

modifying, by the payment processing network, the first authorization request message based on a determination that the validation message with the indication that the payment application has verified the consumer's passcode has been received and that the first transaction is occurring during the time window by including the indication that the payment application has verified the consumer's passcode in the first authorization request message to form a modified first authorization request message;

transmitting, by the payment processing network, the modified first authorization request message to an issuer computer for authorization;

receiving, by the payment processing network, a second authorization request message from a second access device, after the second access device interacts with the mobile communication device during a second transaction, and wherein the consumer did not re-enter the passcode into the payment application to conduct the second transaction;

determining, by the mobile gateway, that the second transaction occurs within the time window;

receiving, by the payment processing network from the mobile gateway, the determination that the second transaction occurs within the time window;

modifying, by the payment processing network, the second authorization request message based on the determination that the second transaction occurs within the time window by including the indication that the payment application has verified the consumer's passcode in the second authorization request message to form a modified second authorization request message; and transmitting, by the payment processing network, the modified second authorization request message to the issuer computer for authorization.

2. The method of claim 1, further comprising:

receiving, by the payment processing network, a third authorization request message from a third access device, after the third access device interacts with the mobile communication device during a third transaction, and wherein the consumer did not re-enter the passcode into payment application to conduct the third transaction;

determining, by the mobile gateway, that the third transaction does not occur within the time window; and denying, by the payment processing network, the third transaction.

3. The method of claim 1 wherein the mobile communication device is a mobile phone with a first contactless element, and wherein the access device comprises a second contactless element.

4. The method of claim 1, wherein the payment processing network is configured to process credit and debit card transaction and wherein the first authorization request message is for a first credit or debit card transaction.

5. The method of claim 1, wherein the payment processing network is configured to perform authorization and clearing and settlement processing.

6. The method of claim 1 wherein the account identifier is a credit or debit card account number.

7. The method of claim 1 further comprising:

receiving, at the payment processing network, an authorization response message indicating whether the first transaction is authorized.

8. The method of claim 7 wherein modifying the first authorization request message comprises modifying the first authorization request message to also include the timestamp when the passcode was entered into the mobile communication device, and the time window.

9. The method of claim 1 wherein the first and second access devices are first and second point of sale terminals, respectively.

10. The method of claim 1 wherein the timestamp includes an absolute time.

11. The method of claim 1 further comprising:

sending the modified first authorization request message to an issuer.

12. The method of claim 1 wherein the first authorization request message and the second authorization request message are ISO 8583 messages.

13. The method of claim 1 wherein the passcode is a PIN.

14. The method of claim 1 wherein the mobile communication device and the first access device interact with each other using near field communications (NFC).

15. The method of claim 1 wherein the first authorization request message is received by the payment processing network via an acquirer computer.

* * * * *